US012669893B2

(12) United States Patent
Ou et al.

(10) Patent No.: US 12,669,893 B2
(45) Date of Patent: Jun. 30, 2026

(54) TOUCH DISPLAY INTEGRATED CIRCUIT AND OPERATING METHOD THEREOF, AND TOUCH DISPLAY DEVICE

(71) Applicant: Novatek Microelectronics Corp., Hsinchu (TW)

(72) Inventors: Chi-Yu Ou, Hsinchu City (TW); Hsiang-Cheng Yu, Hsinchu County (TW); Chin-Lin Lee, Hsinchu City (TW); Chun-Hao Huang, Miaoli County (TW)

(73) Assignee: Novatek Microelectronics Corp., Hsinchu (TW)

( * ) Notice: Subject to any disclaimer, the term of this patent is extended or adjusted under 35 U.S.C. 154(b) by 36 days.

(21) Appl. No.: 18/896,778

(22) Filed: Sep. 25, 2024

(65) Prior Publication Data

US 2026/0086674 A1 Mar. 26, 2026

(51) Int. Cl.
*G06F 3/041* (2006.01)

(52) U.S. Cl.
CPC ................................ G06F 3/04166 (2019.05)

(58) Field of Classification Search
None
See application file for complete search history.

(56) References Cited

U.S. PATENT DOCUMENTS 8,902,174 B1 * 12/2014 Peterson ............. G06F 3/04166
                                                         345/173
9,317,152 B2 4/2016 Pyo et al.

11,287,925 B2 3/2022 Lin et al.
11,650,691 B1 5/2023 Jung et al.
12,340,038 B2 6/2025 Kim et al.
12,386,456 B2 8/2025 Jung
2010/0252336 A1 * 10/2010 Lu ........................ G06F 3/0418
                                                         178/18.06
2014/0132525 A1 5/2014 Pyo et al.
(Continued)

FOREIGN PATENT DOCUMENTS

CN 112530334 3/2021
CN 116149509 5/2023
(Continued)

OTHER PUBLICATIONS

"Office Action of Taiwan Counterpart Application", issued on Feb. 10, 2026, p. 1-p. 4.

*Primary Examiner* — Krishna P Neupane
(74) *Attorney, Agent, or Firm* — JCIPRNET

(57) ABSTRACT

A touch display integrated circuit (IC) and an operating method thereof, and a touch display device are disclosed. The touch display IC includes a scanning circuit and a processing circuit. The scanning circuit is coupled to multiple touch pads of the touch display panel. The scanning circuit is configured to set an initial area, and to generate multiple scanned touch areas by sequentially shifting the initial area with a pre-setting distance. The scanning circuit is configured to obtain multiple touch sensing signals according to the scanned touch areas to generate touch data. A size of the initial area equals to N of the touch pads. The processing circuit is coupled to the scanning circuit. The processing circuit is configured to calculate touch control information corresponding to each of the scanned touch areas according to the touch data.

22 Claims, 10 Drawing Sheets

(56)                    References Cited

U.S. PATENT DOCUMENTS

| | | | |
|---|---|---|---|
| 2021/0064214 A1* | 3/2021 | Hsu | .................... G06F 3/0446 |
| 2021/0089188 A1 | 3/2021 | Lin et al. | |
| 2023/0161437 A1 | 5/2023 | Jung et al. | |
| 2024/0201808 A1 | 6/2024 | Kim et al. | |
| 2024/0211070 A1 | 6/2024 | Jung | |
| 2025/0284357 A1 | 9/2025 | Kim et al. | |

FOREIGN PATENT DOCUMENTS

| | | |
|---|---|---|
| CN | 118259770 | 6/2024 |
| TW | I602087 | 10/2017 |
| TW | 202427147 | 7/2024 |

* cited by examiner

S210

Set an initial area

S220

Sequentially shift the initial area with a pre-setting distance to generate scanned touch areas

S230

Obtain a plurality of touch sensing signals according to the scanned touch areas to generate touch data

S240

Calculate touch control information corresponding to each of the scanned touch areas according to the touch data S610 Generate touch data S620 Process the touch data S630 Calculate center of mass coordinate S640 Calculate touch control information S650 Report the touch control information

TOUCH DISPLAY INTEGRATED CIRCUIT AND OPERATING METHOD THEREOF, AND TOUCH DISPLAY DEVICE

BACKGROUND

Technical Field

This disclosure relates to an electronic device, and in particular to a touch display integrated circuit and an operating method thereof, and a touch display device.

Description of Related Art

In general, the touch display device may operate the touch operation with the finger or the stylus. However, in some situations, the touch operation is insensitive. For example, when the user wears the gloves, due to the thickness of the gloves, the current touch display device senses low touch data. Alternatively, when the finger is suspended to touch the current touch display device, due to the sensing loop of the suspended finger, the current touch display device also senses low touch data. As such, the current touch display device is insensitive to operate the touch operation, and even is incapable of implementing the touch operation.

SUMMARY

Embodiments of the disclosure provide a touch display integrated circuit (IC), adapted to drive a touch display panel, and capable of increasing the touch data.

The touch display IC of the embodiment of the disclosure includes a scanning circuit and a processing circuit. The scanning circuit is coupled to a plurality of touch pads of the touch display panel. The scanning circuit is configured to set an initial area. The scanning circuit is configured to generate a plurality of scanned touch areas by sequentially shifting the initial area with a pre-setting distance. The scanning circuit is configured to obtain a plurality of touch sensing signals according to the scanned touch areas to generate touch data. A size of the initial area equals to N of the touch pads. N is a positive number greater than 1. The processing circuit is coupled to the scanning circuit. The processing circuit is configured to calculate touch control information corresponding to each of the scanned touch areas according to the touch data.

The embodiment of the disclosure further provides an operating method of a touch display IC. The operating method includes the following steps. An initial area is set by a scanning circuit of the touch display IC. The initial area is sequentially shifted with a pre-setting distance to generate a plurality of scanned touch areas by the scanning circuit. A plurality of touch sensing signals are obtained according to the scanned touch areas to generate touch data by the scanning circuit. A size of the initial area equals to N of the touch pads. N is a positive number greater than 1. Touch control information corresponding to each of the scanned touch areas is calculated according to the touch data by a processing circuit of the touch display IC.

The embodiment of the disclosure further provides a touch display device. The touch display device includes a touch display panel and a touch display IC. The touch display panel includes a plurality of touch pads. The touch display IC is coupled to the touch display panel. The touch display IC is configured to drive the touch display panel. The touch display IC includes a scanning circuit and a processing circuit. The scanning circuit is coupled to the touch pads.

The scanning circuit is configured to set an initial area. The scanning circuit is configured to generate a plurality of scanned touch areas by sequentially shifting the initial area with a pre-setting distance. The scanning circuit is configured to obtain a plurality of touch sensing signals according to the scanned touch areas to generate touch data. A size of the initial area equals to N of the touch pads. N is a positive number greater than 1. The processing circuit is coupled to the scanning circuit. The processing circuit is configured to calculate touch control information corresponding to each of the scanned touch areas according to the touch data.

Based on the above, in the touch display IC and the operating method thereof and the touch display device of the embodiment of the disclosure, by sequentially shifting the initial area to generate the scanned touch areas, the scanning circuit obtains the touch sensing signals corresponding to these scanned touch areas. As such, by collecting these touch sensing signals, the touch display IC is capable of increasing the touch data, so as to improve a sensitivity and an accuracy of the touch operation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
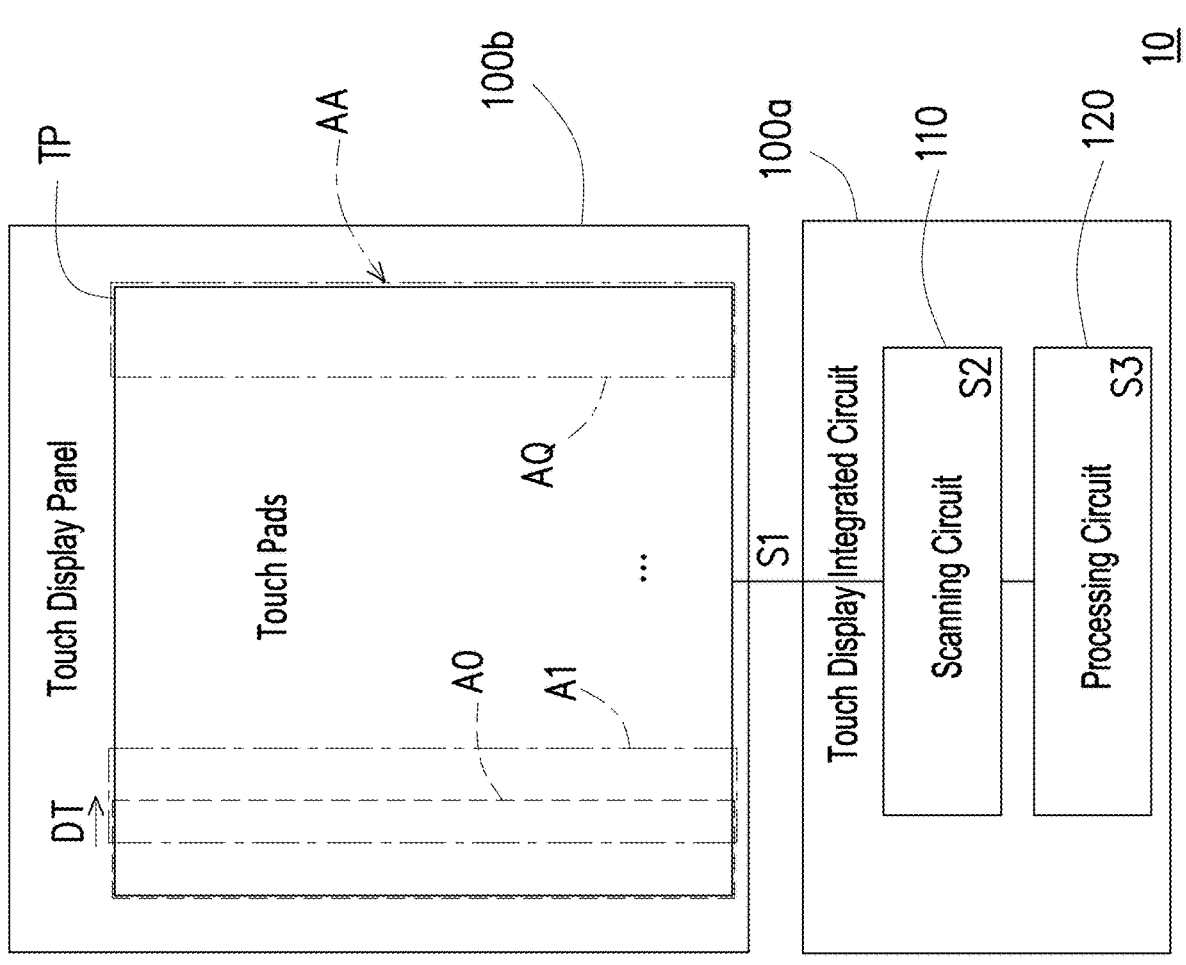
FIG. 1 is a circuit block diagram of a touch display device according to an embodiment of the disclosure.
Figure 1:
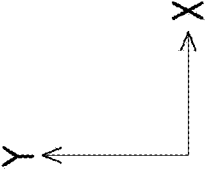

Some embodiments of the disclosure will be described in detail below with reference to the accompanying drawings. The reference numerals cited in the following description will be regarded as the same or similar elements when the same reference numeral appears in different drawings. These embodiments are only part of the disclosure and do not disclose all possible implementations of the disclosure. Rather, these embodiments are merely examples within the scope of the disclosure.

FIG. 1 is a circuit block diagram of a touch display device according to an embodiment of the disclosure. Referring to FIG. 1, the touch display device 10 may be an electronic device with a touch display function. The touch display device 10 includes a touch display integrated circuit (IC) 100$a$ and a touch display panel 100$b$. The touch display panel 100$b$ is coupled to the touch display IC 100$a$. The touch display panel 100$b$ includes a plurality of touch pads TP. The touch pads TP are disposed in an active area AA of the touch display panel 100$b$. The touch pads TP are arranged in an array, and have the same circuit architecture.

In this embodiment, the touch display IC 100$a$ is adapted to drive the touch display panel 100$b$. The touch display IC 100$a$ may be, for example, a touch and display driver integration (TDDI) IC that integrates a display driver IC and a touch IC. The touch display IC 100$a$ includes a scanning circuit 110 and a processing circuit 120. The scanning circuit 110 is coupled to the touch pads TP. The scanning circuit 110 is configured to drive the touch pads TP, and to receive and process signals and/or data (e.g., touch sensing signals S1) output from these touch pads TP.

In this embodiment, the processing circuit 120 is coupled to the scanning circuit 110. The processing circuit 120 is configured to process signals and/or data (e.g., touch data S2) output from the scanning circuit 110, for generating a touch result (e.g., touch control information S3). In another embodiment, the processing circuit 120 is further coupled to a host device (e.g., the host device HD shown in FIG. 4) for reporting the touch control information S3.

Figure 2:
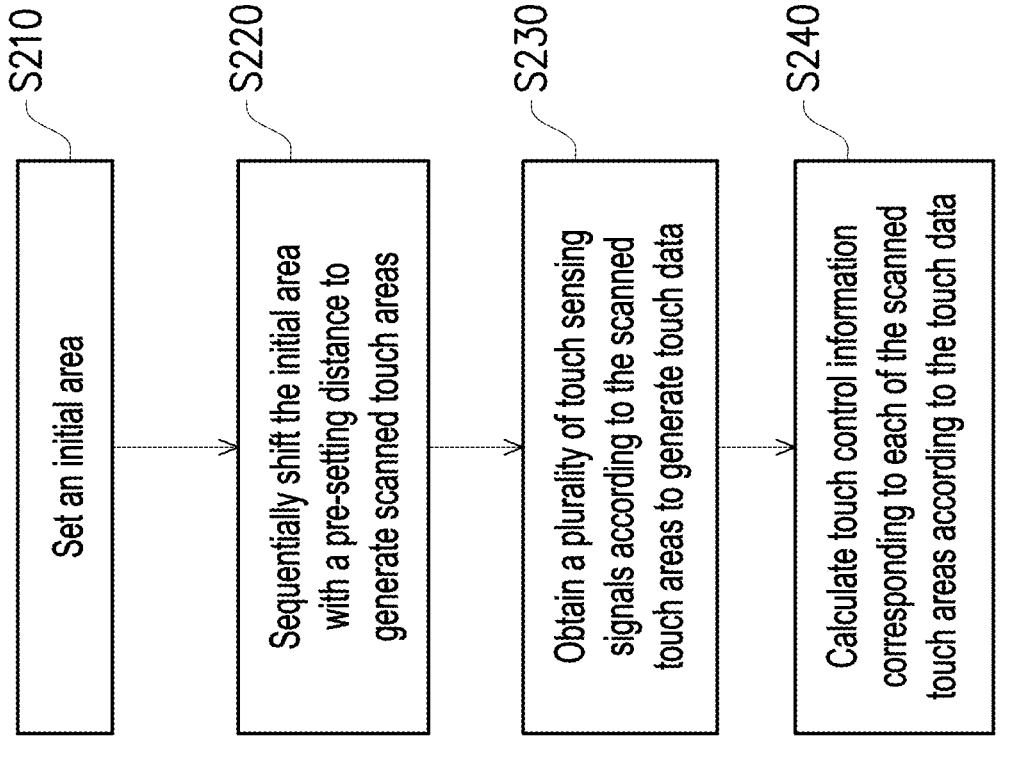
FIG. 2 is a flow chart of an operating method of the touch display integrated circuit according to an embodiment of the disclosure.

FIG. 2 is a flow chart of an operating method of the touch display integrated circuit according to an embodiment of the disclosure. Referring to FIGS. 1 and 2, the touch display IC 100$a$ may execute the following steps S210 to S240. The order of these steps S210 to S240 is only for illustration and not limited thereto.

In step S210, the scanning circuit 110 sets an initial area A0. The initial area A0 is a partial area of the active area AA. A size of the initial area A0 equals to N of the touch pads. N is a positive number greater than 1. The initial area A0 may be, for example, in a rectangular shape.

In step S220, the scanning circuit 110 generates a plurality of scanned touch areas A1 to AQ by sequentially shifting the initial area A0 with a pre-setting distance DT. Q is positive integer greater than 1. In an X-Y plane, these scanned touch areas A1 to AQ are sequentially overlapped, and have the same size as the size of the initial area A0.

In detail, for example, with respect to one direction (e.g., an X direction), the scanning circuit 110 shifts the initial area A0 with the pre-setting distance DT to generate the scanned touch area A1. At this time, in the X-Y plane, the current initial area A0 is overlapped with the scanned touch area A1. Then, with the same direction, the scanning circuit 110 shifts the current initial area A0 (i.e., the scanned touch area A1) with the pre-setting distance DT to generate another scanned touch area A2, and so on.

In step S230, the scanning circuit 110 obtains a plurality of touch sensing signals S1 according to the scanned touch areas A1 to AQ to generate touch data S2. The touch data S2 may be, for example, digital data that the processing circuit 120 is capable of operating it.

Alternatively stated, with respect to the one direction (e.g., an X direction), the scanning circuit 110 scans the active area AA by sequentially shifting the initial area A0 with the fixed distance DT. The scanning circuit 110 collects the touch sensing signals S1 output from the touch pads TP arranged in the scanned touch areas A1 to AQ. The scanning circuit 110 processes the touch sensing signals S1 to output the touch data S2.

In step S240, the processing circuit 120 calculates touch control information S3 corresponding to each of the scanned touch areas A1 to AQ according to the touch data S2. The touch control information S3 includes report coordinates among these scanned touch areas A1 to AQ.

Please note that, since each one of the scanned touch areas A1 to AQ is overlapped with multiple touch pads TP, the touch sensing signals S1 corresponding to these scanned touch areas A1 to AQ are massive. Besides, since the scanned touch areas A1 to AQ are sequentially overlapped with the same pre-setting distance DT, the touch sensing signals S1 may precisely indicate each one of the report coordinates in the active area AA. Therefore, based on these touch sensing signals S1, even the touch display device 10 is applied with the gloves or the suspended finger, the touch display IC 100$a$ is capable of increasing the touch data S2 for improving a sensitivity of the touch operation, and is capable of increasing an accuracy of the report coordinates.

Figure 3:
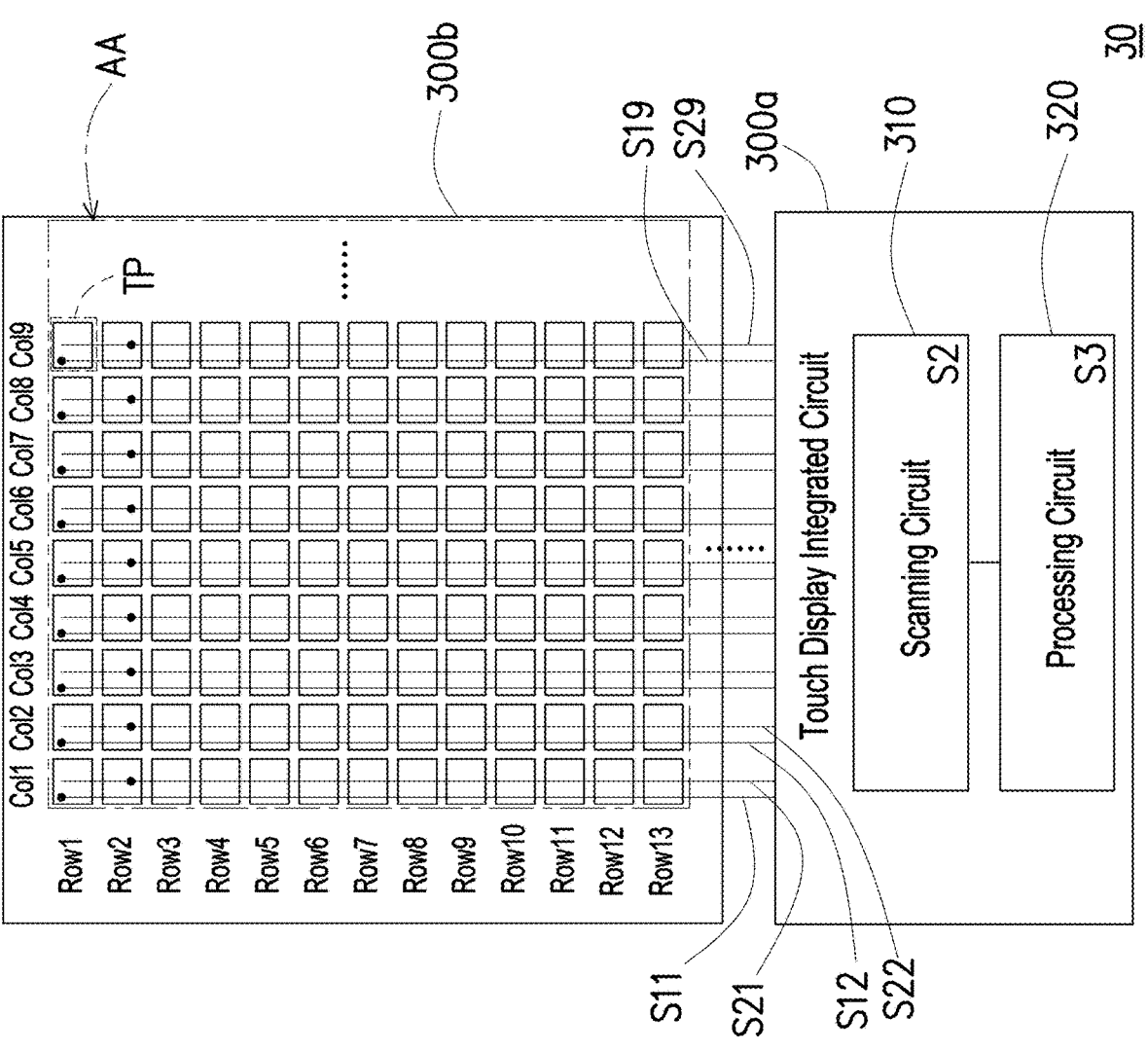
FIG. 3 is a circuit block diagram of a touch display device according to another embodiment of the disclosure.

FIG. 3 is a circuit block diagram of a touch display device according to another embodiment of the disclosure. Referring to FIG. 3, the touch display device 30 includes a touch display IC 300$a$ and a touch display panel 300$b$. The touch display panel 100$b$ includes multiple touch pads TP. The touch display IC 300$a$ includes a scanning circuit 310 and a processing circuit 320. The touch pads TP, the scanning circuit 310 and the processing circuit 320 may be described with reference to and by analogy with the touch display device 10.

In the embodiment of FIG. 3, the touch pads TP are arranged in an array (referred to as a touch pad array hereinafter). In the X-Y plane, the touch pad array may include, for example, 13 rows and 9 columns. The number of rows and columns of the array is only for illustration and not limited thereto.

Figure 4:
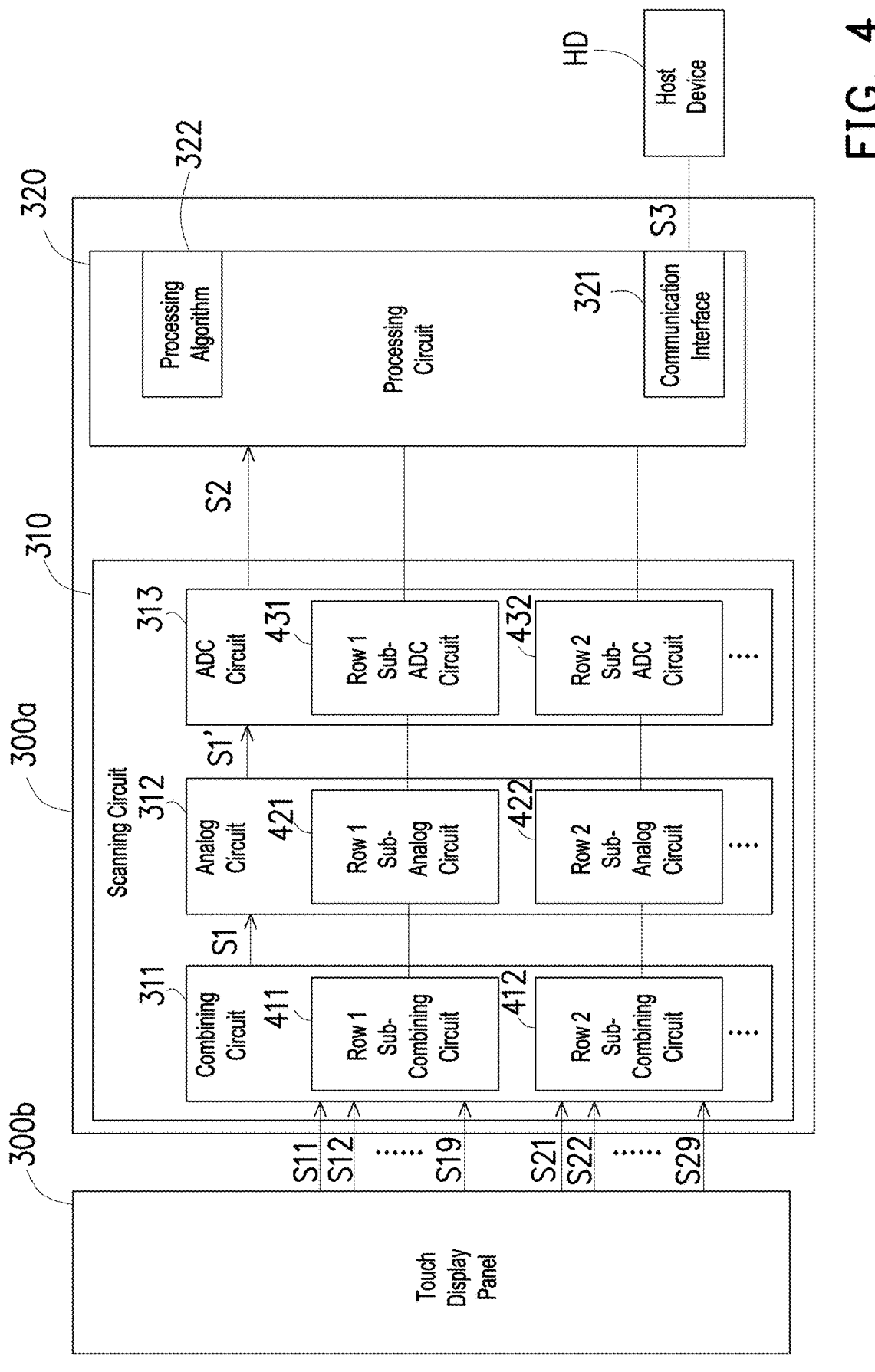
FIG. 4 is a circuit block diagram of a touch display integrated circuit according to the embodiment of FIG. 3 of the disclosure.

Referring to FIGS. 3 and 4, FIG. 4 is a circuit block diagram of a touch display integrated circuit according to the embodiment of FIG. 3 of the disclosure. The scanning circuit 310 includes a combining circuit 311, an analog circuit 312 and an analog-to-digital converter (ADC) circuit 313. The combining circuit 311 is coupled to the touch pads TP. The combining circuit 311 is configured to generate the scanned touch areas (e.g., the scanned touch areas A1 to AQ as shown in FIG. 1). The combining circuit 311 is configured to obtain the touch sensing signals S1 according to the scanned touch areas.

Specifically, the combining circuit 311 includes multiple sub-combining circuits, such as the sub-combining circuits 411 to 412. In FIG. 4, two of the sub-combining circuits 411 to 412 are illustrated, and the others are omitted. These sub-combining circuits 411 to 412 respectively correspond to different rows of the touch pad array. The sub-combining circuits 411 to 412 have the same circuit architecture.

In detail, the sub-combining circuit 411 is coupled to the touch pads TP arranged in the first row (e.g., illustrated as Row1 in FIG. 4) and multiple columns (e.g., illustrated as Col1 to Col9 in FIG. 4). The sub-combining circuit 411 drives these touch pads TP, and receives the corresponding touch sensing signals S11 to S19 output from these touch pads TP. The sub-combining circuit 412 is coupled to the touch pads TP arranged in the second row (e.g., illustrated as Row2 in FIG. 4) and multiple columns (e.g., illustrated as Col1 to Col9 in FIG. 4). The sub-combining circuit 412 drives these touch pads TP, and receives the corresponding touch sensing signals S21 to S29 output from these touch pads TP, and so on.

In this embodiment, the analog circuit 312 is coupled to the combining circuit 311. The analog circuit 312 is configured to process the touch sensing signals S1, and to generate a plurality of modulated touch sensing signals S1' according to these touch sensing signals S1. For example, the analog circuit 312 filters noise of the touch sensing signals S1, and amplifies the filtered touch sensing signals S1 to generate the modulated touch sensing signals S1'.

Specifically, the analog circuit 312 includes multiple sub-analog circuits, such as the sub-analog circuits 421 to 422. In FIG. 4, two of the sub-analog circuits 421 to 422 are illustrated, and the others are omitted. These sub-analog circuits 421 to 422 respectively correspond to different rows of the touch pad array. The sub-analog circuits 421 to 422 have the same circuit architecture.

In detail, the sub-analog circuit 421 is coupled to the sub-combining circuit 411. The sub-analog circuit 421 generates the corresponding modulated touch sensing signals S1' according to the received touch sensing signals S11 to S19. The sub-analog circuit 422 is coupled to the sub-combining circuit 412. The sub-analog circuit 422 generates the corresponding modulated touch sensing signals S1' according to the received touch sensing signals S21 to S29, and so on.

In this embodiment, the ADC circuit 313 is coupled to the analog circuit 312 and the processing circuit 320. The ADC circuit 313 is configured to process the modulated touch sensing signals S1', and to generate the touch data S2 according to the modulated touch sensing signals S1'. For example, the ADC circuit 313 transfer the modulated touch sensing signals S1' from an analog form into a digital form, to generate the touch data S2.

Specifically, the ADC circuit 313 includes multiple sub-ADC circuits, such as the sub-ADC circuits 431 to 432. In FIG. 4, two of the sub-ADC circuits 431 to 432 are illustrated, and the others are omitted. These sub-ADC circuits 431 to 432 respectively correspond to different rows of the touch pad array. The sub-ADC circuits 431 to 432 have the same circuit architecture.

In detail, the sub-ADC circuit 431 is coupled to the sub-analog circuit 421. The sub-ADC circuit 431 generates the corresponding touch data S2 according to the modulated touch sensing signals S1' output from the sub-analog circuit 421. The sub-ADC circuit 432 is coupled to the sub-analog circuit 422. The sub-ADC circuit 432 generates the corresponding touch data S2 according to the modulated touch sensing signals S1' output from the sub-analog circuit 422, and so on.

In the embodiment of FIG. 4, the processing circuit 320 may be, for example, a microcontroller unit (MCU). The processing circuit 320 includes a communication interface 321 and a memory (not shown). The memory stores a processing algorithm 322. The processing circuit 320 is configured to execute the processing algorithm 322 to implement various functions of the touch operation. For example, based on the processing algorithm 322, the processing circuit 320 calculates the touch control information S3 according to the touch data S2.

In this embodiment, the processing circuit 320 is coupled to the host device HD through the communication interface 321. The processing circuit 320 is configured to output the touch control information S3 to the host device HD through the communication interface 321. The communication interface 321 may be, for example, an interface such as an inter-integrated circuit (I2C), a serial peripheral interface bus (SPI), or a general-purpose input/output (GPIO), etc. The host device may be, for example, an electronic device such as a mobile phone, a tablet computer, a notebook computer, and a desktop computer, etc.

Figure 5:
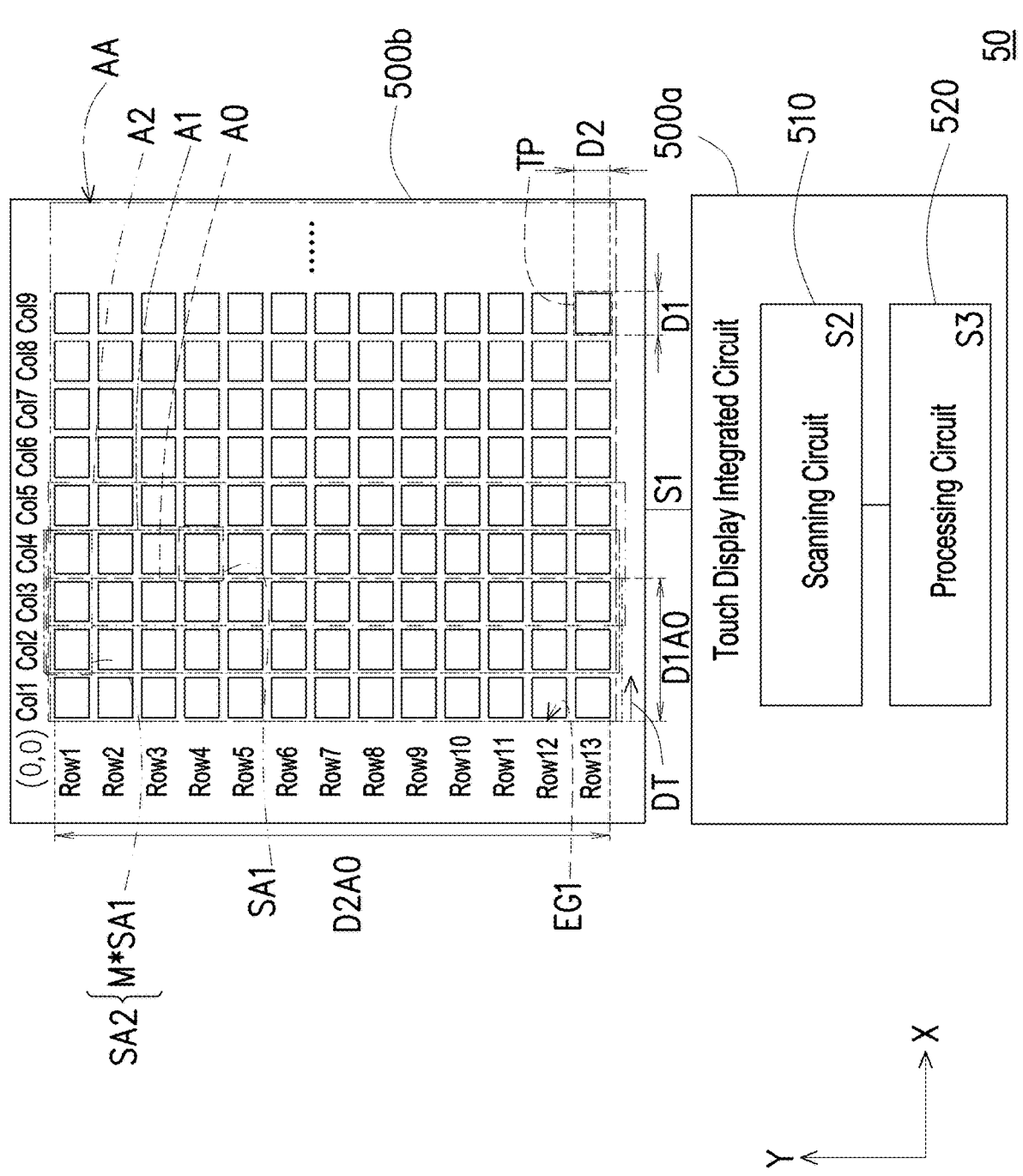
FIG. 5 is a schematic diagram of operations of a touch display integrated circuit according to another embodiment of the disclosure.

FIG. 5 is a schematic diagram of operations of a touch display integrated circuit according to another embodiment of the disclosure. Referring to FIG. 5, the touch display device 50 includes a touch display IC 500a and a touch display panel 500b. The touch display panel 500b includes multiple touch pads TP. The touch display IC 500a includes a scanning circuit 510 and a processing circuit 520. The touch pads TP, the scanning circuit 510 and the processing circuit 520 may be described with reference to and by analogy with the touch display device 10 or 30.

In the embodiment of FIG. 5, in the X-Y plane, the touch pad array arranged by the touch pads TP includes 13 rows and 9 columns. Each one of the touch pads TP has a width D1 extending along the X direction, and a length D2 extending along the Y direction.

In this embodiment, in the X-Y plane, the initial area A0 set by the scanning circuit 510 is overlapped with a part of the touch pad array. Such part of the touch pad array includes N of the touch pads TP. N is a positive integer greater than 1. N may be, for example, the number of 13 multiplied with 3.

In detail, in the X-Y plane, the initial area A0 is overlapped with the touch pads TP arranged in 13 rows (i.e., illustrated as Row1 to Row13 in FIG. 5) and the first column to the third column (i.e., illustrated as Col1 to Col3 in FIG. 5). Alternatively stated, the size of the initial area A0 equals to a width D1A0 multiplied with a length D2A0. The width D1A0 is 3 times of the widths D1 of the touch pads TP (i.e., 3*D1). The length D2A0 is 13 times of the length D2 of the touch pads TP (i.e., 13*D2).

In addition, in the X-Y plane, the initial area A0 is overlapped with a first edge EG1 of the active area AA. The first edge EG1 may be, for example, one long side of the active area AA, and extends along the Y direction.

In this embodiment, the pre-setting distance DT is less than the width D1A0 of the initial area A0. For example, the pre-setting distance DT equals to the width D1 of one touch pad TP, which is less than 3 times of the widths D1 (i.e., the width D1A0). Alternatively, the pre-setting distance DT is less than the length D2A0 of the initial area A0. For example, the pre-setting distance DT equals to the length D2 of one touch pad TP, which is less than 13 times of the length D2 (i.e., the length D2A0).

In this embodiment, the scanning circuit 510 sequentially shifts the initial area A0 with the pre-setting distance DT with respect to the X direction. By shifting the initial area A0 among the active area AA, the scanning circuit 510 generates multiple scanned touch areas (e.g., including the scanned touch areas A1 and A2).

In another embodiment, the scanning circuit 510 sequentially shifts the initial area A0 with the pre-setting distance DT with respect to another direction, such as the Y direction. The scanning circuit 510 generates the corresponding scanned touch areas accordingly. In another embodiment, the scanning circuit 510 sequentially shifts the initial area A0 in a chessboard shape. That is, the scanning circuit 510 sequentially shifts the initial area A0 with the pre-setting distance DT with respect to both of the X direction and the Y direction. The scanning circuit 510 generates the corresponding scanned touch areas accordingly.

Specifically, in this embodiment, the scanning circuit 510 generates a first scanned touch area A1 by shifting the initial area A0 with the pre-setting distance DT with respect to the X direction. In the X-Y plane, the first scanned touch area A1 is overlapped with the touch pads TP arranged in 13 rows (i.e., illustrated as Row1 to Row13 in FIG. 5) and the second column to the fourth column (i.e., illustrated as Col2 to Col4 in FIG. 5).

Then, the scanning circuit 510 generates a second scanned touch area A2 by shifting the first scanned touch area A1 with the pre-setting distance DT with respect to the X direction. In the X-Y plane, the second scanned touch area A2 is overlapped with the touch pads TP arranged in 13 rows (i.e., illustrated as Row1 to Row13 in FIG. 5) and the third column to the fifth column (i.e., illustrated as Col3 to Col5 in FIG. 5).

In this embodiment, in the X-Y plane, both of the first scanned touch area A1 and the second scanned touch area A2 are not overlapped with the first edge EG1 of the active area AA. In the X-Y plane, the first scanned touch area A1 and the second scanned touch area A2 are overlapped with at least one scanned sub-area SA1. One scanned sub-area SA1 has a size of one touch pad TP. That is, a width of the scanned sub-area SA1 equals to the width D1 of the touch pad TP. A length of the scanned sub-area SA1 equals to the length D2 of the touch pad TP.

For example, as shown in FIG. 5, in the X-Y plane, based on the initial area A0 and the pre-setting distance DT, two sequential scanned touch areas A1 and A2 are overlapped with multiple scanned sub-areas SA1. In the X-Y plane, these scanned sub-areas SA1 are overlapped with the touch pads TP arranged in 13 rows (i.e., illustrated as Row1 to Row13 in FIG. 5) and the third column to the fourth column (i.e., illustrated as Col3 to Col4 in FIG. 5).

Then, the scanning circuit 510 collects the touch sensing signals S1 output from the touch pads TP that are arranged in the scanned touch areas (e.g., including the scanned touch areas A1 and A2). The scanning circuit 510 generates touch data S2 according to the obtained touch sensing signals S1.

Specifically, the scanning circuit 510 obtains a first plurality of touch sensing signals S1 according to the first scanned touch area A1. The scanning circuit 510 further obtains a second plurality of touch sensing signals S1 according to the second scanned touch area A2. Alternatively stated, the scanning circuit 510 collects the touch sensing signals S1 output from the touch pads TP arranged in the first scanned touch area A1, and collects the touch sensing signals S1 output from the touch pads TP arranged in the second scanned touch area A2.

Furthermore, the scanning circuit 510 processes the touch sensing signals S1 corresponding to the first scanned touch area A1 to generate first touch data. The scanning circuit 510 further processes the touch sensing signals S2 corresponding to the second scanned touch area A2 to generate second touch data. The processing operation performed by the scanning circuit 510 includes the filtering, the amplifying and the transferring from the analog form into the digital form, as described with reference to the embodiment of FIG. 4.

In this embodiment, the first touch data and the second touch data are parts of the touch data S2. The first touch data indicates the touch operation performed in the first scanned touch area A1. The second touch data indicates the touch operation performed in the second scanned touch area A2.

It should be noted that, by combining multiple rows of the touch pad array to generate one scanned touch area (e.g., the first scanned touch area A1), the scanning circuit 510 collects massive touch sensing signals S1 accordingly. As such, the touch display IC 500a is capable of increasing the amount of the touch data S2. In addition, by sequentially shifting the combined rows (i.e., the initial area A0), the scanning circuit 510 collects the touch data S2 corresponding to each of the rows. As such, the touch display IC 500a is capable of increasing the signal-to-noise (SNR) of the touch data S2.

Continued with the above description, the processing circuit 520 calculates the touch control information S3 according to the touch data S2. As such, the processing circuit 520 obtains the report coordinates corresponding to each one of the touch pads TP.

Specifically, the processing circuit 520 calculates first touch control information according to the first touch data. The first touch control information corresponds to a first scanned sub-area of the first scanned touch area A1. The first scanned sub-area may be, for example, the illustrated scanned sub-area SA1 in FIG. 5. In the X-Y plane, the first scanned sub-area is overlapped with one touch pad TP, and has the size of one touch pad TP. The first touch control information is a part of the touch control information S3. The first touch control information indicates the report coordinate in the first scanned touch area A1, and especially indicates the report coordinate in the first scanned sub-area.

In addition, the processing circuit 520 calculates second touch control information according to the second touch data. The second touch control information corresponds to a second scanned sub-area of the second scanned touch area A2. The second scanned sub-area is adjacent to the first scanned sub-area. The second scanned sub-area may be, for example, located at the fourth row (i.e., illustrated as Row4 in FIG. 5) and the fifth column (i.e., illustrated as Col5 in FIG. 5). In the X-Y plane, the second scanned sub-area is overlapped with one touch pad TP, and has the size of one touch pad TP. The second touch control information is a part of the touch control information S3. The second touch control information indicates the report coordinate in the second scanned touch area A2, and especially indicates the report coordinate in the second scanned sub-area.

Figure 6:
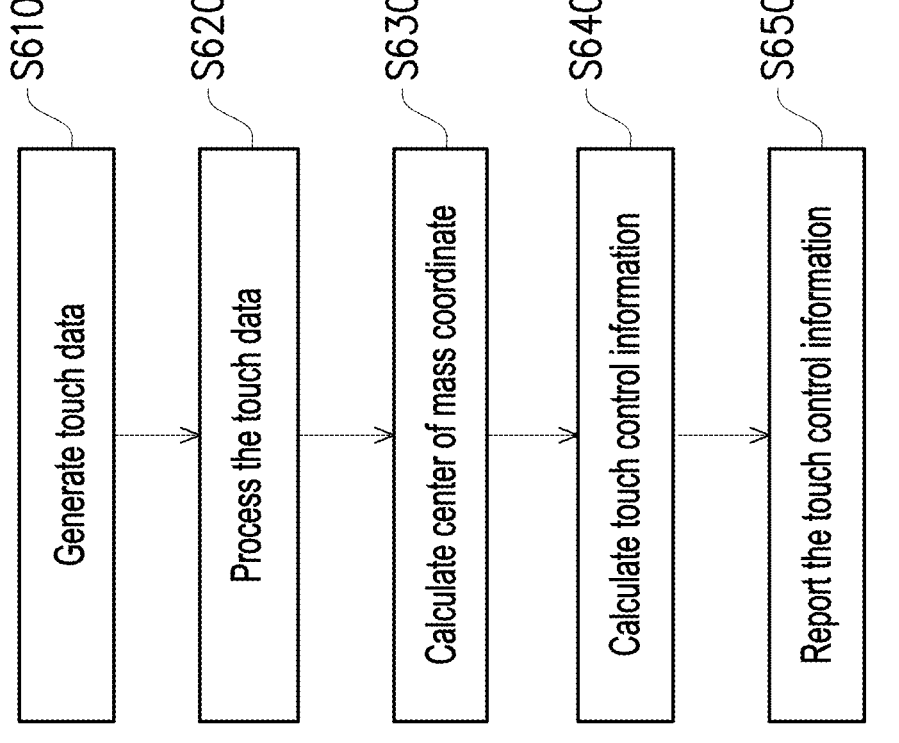
FIG. 6 is a flow chart of an operating method of the touch display integrated circuit according to the embodiment of FIG. 5 of the disclosure.

FIG. 6 is a flow chart of an operating method of the touch display integrated circuit according to the embodiment of FIG. 5 of the disclosure. Referring to FIGS. 5 and 6, the touch display IC 500a may execute the following steps S610 to S650, to illustrate how the touch display IC 500a obtains the touch control information S3. The order of these steps S610 to S650 is only for illustration and not limited thereto.

In step S610, based on the scanned touch areas (e.g., including the scanned touch areas A1 and A2), the scanning circuit 510 generates the touch data S2 according to the touch sensing signals S1. The scanning circuit 510 outputs the touch data S2 to the processing circuit 520.

In step S620, the processing circuit 520 processes the touch data S2. For example, the processing circuit 520 filters dummy data of the touch data S2.

In step S630, the processing circuit 520 calculates a center of mass coordinate of each of M of the scanned sub-areas SA1 (e.g., an area SA2) according to the touch data S2. In step S640, based on the calculated center of mass coordinates, the processing circuit 520 calculates the touch control information S3.

In this embodiment, each of the scanned touch areas (e.g., including the scanned touch areas A1 and A2) includes M of the scanned sub-areas SA1 (e.g., the area SA2). M is a positive number greater than 1 and less than N. N is the number of the touch pads TP included in the initial area A0, and may be the number of 13 multiplied with 3. M may be, for example, the number of 1 multiplied with 3. In this embodiment, a size of each of M of the scanned sub-areas SA1 equals to M of the touch pads TP. Alternatively stated, in the X-Y plane, one scanned sub-area SA1 and one touch pad TP have the same size.

Take the first scanned touch area A1 as an example, in the X-Y plane, the first scanned touch area A1 includes multiple sets of the M of the scanned sub-areas SA1. These sets are located from the first row (i.e., illustrated as Row1 in FIG. 5) to the last row (i.e., illustrated as Row13 in FIG. 5). In the X-Y plane, M of the scanned sub-areas SA1 (i.e., the area SA2) in such scanned touch area A1 is overlapped with M of the touch pads TP. These M of the touch pads TP may be, for example, arranged in the first row (i.e., illustrated as Row1 in FIG. 5) and the second column to the fourth column (i.e., illustrated as Col2 to Col4 in FIG. 5).

Figure 7:
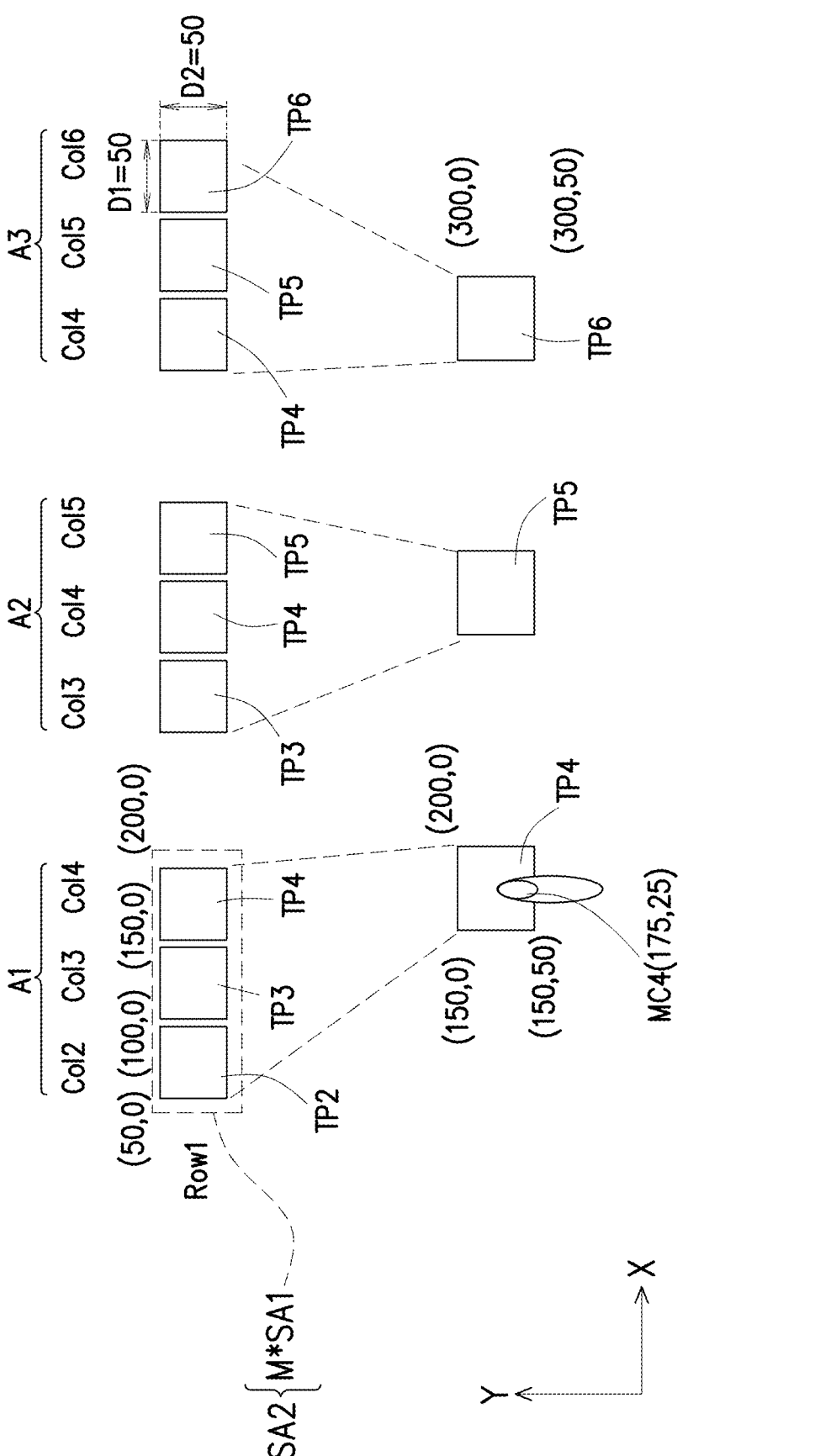
FIG. 7 is a schematic diagram of operations of the touch display integrated circuit according to the embodiment of FIG. 5 of the disclosure.

Please referring to FIG. 7, FIG. 7 is a schematic diagram of operations of the touch display integrated circuit according to the embodiment of FIG. 5 of the disclosure. In FIG. 7, it is shown a few touch pads TP2 to TP6 corresponding to the scanned touch areas A1 to A3 that are sequentially and partially overlapped with each other, to exemplary illustrate how the processing circuit 520 operates in steps S630 to S640 in detail.

In this embodiment, as shown in FIG. 5, it is assumed that an initial position of the active area AA is illustrated as (0, 0). It is assumed that the width D1 of one touch pad TP may be 50 units, and the length D2 of one touch pad TP may be 50 units. As such, as shown in FIG. 7, in the first scanned touch area A1, the scanned sub-area SA1 that is overlapped with the touch pad TP2 may be at least located at a position illustrated as (50,0). The touch pad TP2 is arranged at the first row (i.e., illustrated as Row1) and the second column (i.e., illustrated as Col2).

In addition, as shown in FIG. 7, in the first scanned touch area A1, another scanned sub-area SA1 that is overlapped with the touch pad TP3 may be at least located at a position illustrated as (100,0). The touch pad TP3 is arranged at the first row (i.e., illustrated as Row1) and the third column (i.e., illustrated as Col3). In the first scanned touch area A1, the other scanned sub-area SA1 that is overlapped with the touch pad TP4 may be at least located at a position illustrated as (150,0). The touch pad TP4 is arranged at the first row (i.e., illustrated as Row1) and the fourth column (i.e., illustrated as Col4). The positions of the scanned sub-areas A1 in the scanned touch areas A2 and A3 may be described with reference to and by analogy with the scanned sub-areas SA1 in the first scanned touch area A1.

Continued with the description regarding step S630, as shown in FIG. 7, take the first scanned touch area A1 as an example, the processing circuit 520 calculates the center of mass coordinate of M of the scanned sub-areas SA1 (e.g., the area SA2) according to the corresponding touch data S2. The foresaid center of mass coordinate indicates a position of the touch pad TP4, and may be illustrated as (4, 1).

In the embodiment, the processing circuit 520 multiplies the center of mass coordinate with the size of each of the touch pads TP to generate an intermediate coordinate. The intermediate coordinate indicates a position of M of the scanned sub-areas SA1 (e.g., the area SA2).

As shown in FIG. 7, take the first scanned touch area A1 as an example, the processing circuit 520 multiplies the center of mass coordinate (e.g., (4, 1)) with the size of the touch pad TP2, to generate the intermediate coordinate of the scanned sub-areas SA1 (e.g., the area SA2). In detail, the intermediate coordinate with respect to the X direction may be 4 units multiplied with the width D1 (i.e., 50 units). The intermediate coordinate with respect to the Y direction may be 1 unit multiplied with the length D2 (i.e., 50 units). As such, the intermediate coordinate of the scanned sub-areas SA1 (e.g., the area SA2) corresponding to the first row (i.e., illustrated as Row1) may be illustrated as (200, 50).

Then, the processing circuit 520 subtracts an offset coordinate from the intermediate coordinate to generate the touch control information S3 corresponding to one of the M of the scanned sub-areas SA1 (e.g., the area SA2). Such touch control information S3 is set to be as one of the touch control information S3 of one corresponding of the scanned touch areas (e.g., including the scanned touch areas A1 and A2). Alternatively stated, the touch control information S3 of one scanned touch area includes the touch control information S3 of one scanned sub-area SA1 thereto.

In this embodiment, the offset coordinate indicates a displacement between two of the scanned touch areas (e.g., including the scanned touch areas A1 and A2) that are sequentially generated. The offset coordinate is set according to a half of the pre-setting distance DT and a half of the length D2 of one touch pad TP. As such, the offset coordinate may be illustrated as (50/2, 50/2). Alternatively, the offset coordinate is set according to the half of the pre-setting distance DT and a half of the width D1 of one touch pad TP.

As shown in FIG. 7, take the first scanned touch area A1 as an example, the processing circuit 520 subtracts the offset coordinate (e.g., (50/2, 50/2)) from the intermediate coordinate (e.g., (200, 50)) to generate the touch control information S3 corresponding to one scanned sub-area SA1. The foresaid scanned sub-area SA1 may be the one that is overlapped with the touch pad TP4. As such, the touch control information S3 corresponding to such scanned sub-area SA1 may be illustrated as a position coordinate MC4 (175, 25). The position coordinate MC4 (175, 25) is also set to be as one of the touch control information S3 of the first scanned touch area A1.

It should be noted that, even though the intermediate coordinate indicates the position of the M of the scanned sub-areas SA1 (e.g., the area SA2), rather than one scanned sub-area SA1, by subtracting the offset coordinate from the intermediate coordinate, the subtracted result (i.e., the report coordinate) indicates the position of one scanned sub-area SA1, and is considered as the touch control information S3 corresponding to one touch pad TP. Thereby, the processing circuit 520 optimizes the scale of the report coordinates.

Back to FIG. 6, in step S650, the processing circuit 520 reports the touch control information S3 to the host device (e.g., the host device HD shown in FIG. 4).

Figure 8:
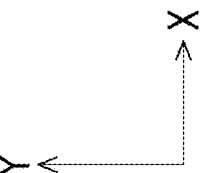
FIG. 8 is a schematic diagram of operations of a touch display integrated circuit according to another embodiment of the disclosure.

FIG. 8 is a schematic diagram of operations of a touch display integrated circuit according to another embodiment of the disclosure. Referring to FIG. 8, the touch display device 80 includes a touch display IC 800a and a touch display panel 800b. The touch display panel 800b includes multiple touch pads TP. The touch display IC 800a includes a scanning circuit 810 and a processing circuit 820. The touch pads TP, the scanning circuit 810 and the processing circuit 820 may be described with reference to and by analogy with the touch display device 10, 30 or 50.

Relative to the embodiment in FIG. 5, in this embodiment, the scanning circuit 810 further sets a first edge area A11. A size of the first edge area A11 equals to P of the touch pads TP. These P of the touch pads TP are adjacent to the first edge EG1 of the active area AA. P is a positive number greater than 1. P may be, for example, the number of 13 multiplied with 1. In detail, in the X-Y plane, the first edge area A11 is overlapped with the touch pads TP arranged in 13 rows (i.e., illustrated as Row1 to Row13 in FIG. 8) and the first column (i.e., illustrated as Col1 in FIG. 8).

In this embodiment, the scanning circuit 810 sets a second edge area A12 that is adjacent to the first edge area A11. A size of the second edge area A12 equals to the P of the touch pads TP, that is equals to the size of the first edge area A11. Alternatively stated, in the X-Y plane, the second edge area A12 is adjacent to the first edge area A11, and is overlapped with the touch pads TP arranged in 13 rows (i.e., illustrated as Row1 to Row13 in FIG. 8) and the second column (i.e., illustrated as Col2 in FIG. 8).

Figure 9A:
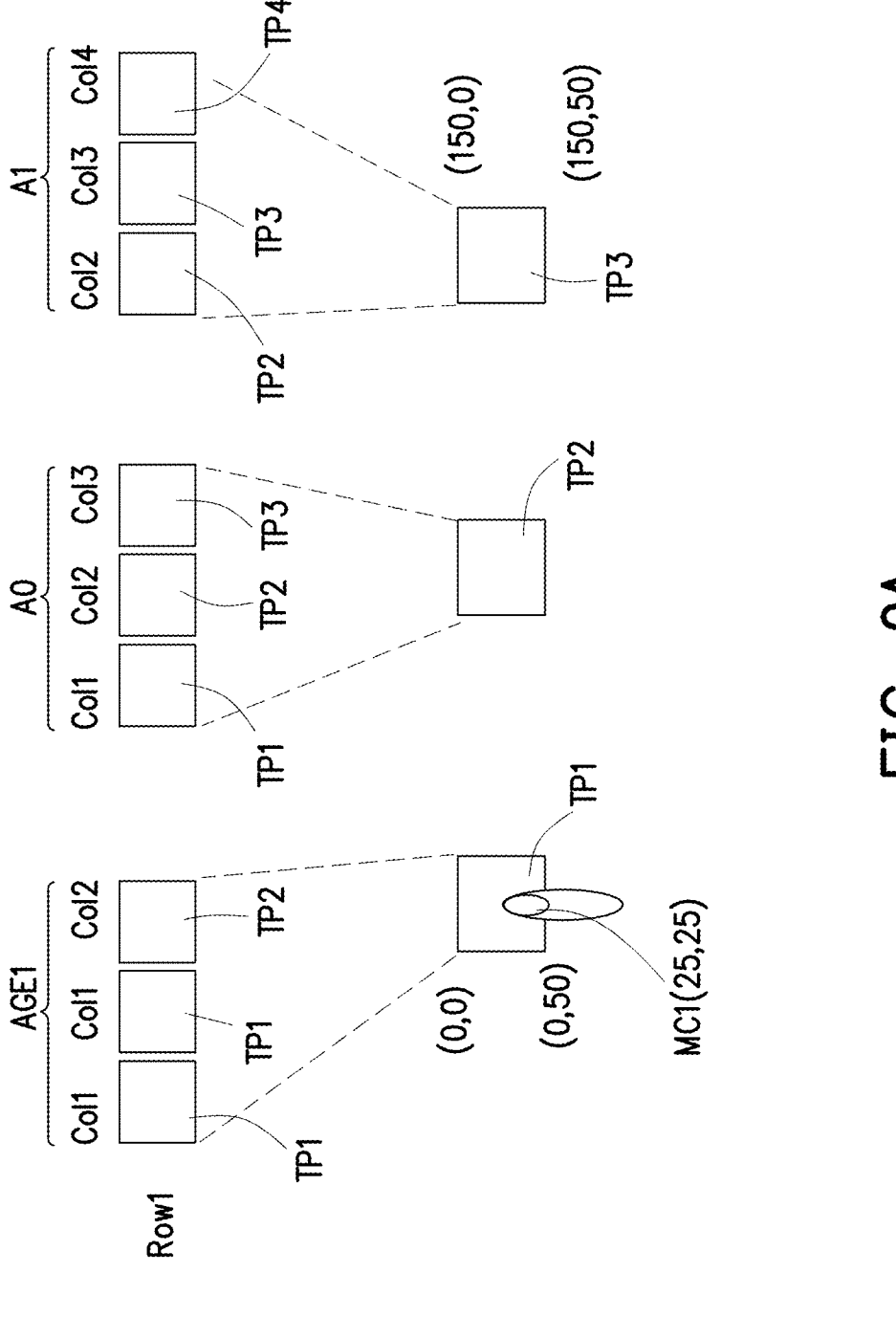
FIGS. 9A and 9B are schematic diagrams of operations of the touch display integrated circuit according to the embodiment of FIG. 8 of the disclosure.
Figure 9B:
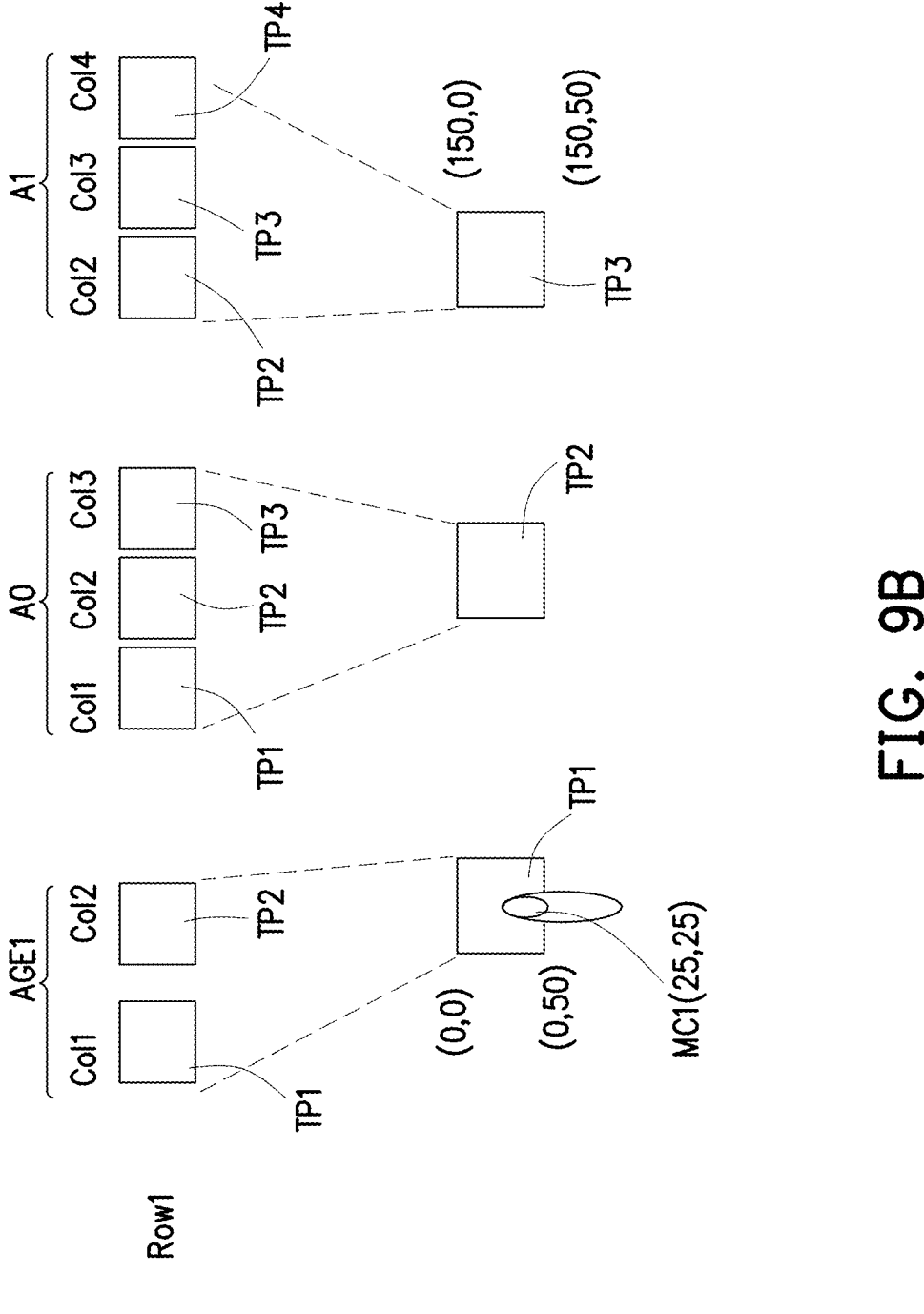

Further referring to FIGS. 9A and 9B, FIGS. 9A and 9B are schematic diagrams of operations of the touch display integrated circuit according to the embodiment of FIG. 8 of the disclosure. In FIGS. 9A and 9B, relative to the embodiment in FIG. 7, it is shown a few touch pads TP1 and TP2 in an edge scanned touch area AEG1, to exemplary illustrate how the touch display IC 800*a* calculates the touch control information regarding the edge area of the display panel 800*b*.

In the embodiment of FIG. 9A, the scanning circuit 810 generates the edge scanned touch area AEG1 by collecting the second edge area A12 and at least one of the first edge area A11. The edge scanned touch area AEG1 indicates the edge area of the display panel 800*b*, for collecting enough corresponding signals. In detail, in the X-Y plane, two first edge areas A11 and one second edge area A12 are collected to be the edge scanned touch area AEG1.

As described above in the embodiment of FIG. 5, the scanning circuit 810 generates the initial area A0 and multiple scanned touch areas (e.g., including, the first scanned touch area A1). The scanning circuit 810 obtains the touch sensing signals S1 corresponding to the scanned touch areas to generate the touch data S2.

In addition, the scanning circuit 810 obtains a plurality of edge touch sensing signals S1E according to the edge scanned touch area AEG1 to generate edge touch data. Alternatively stated, the scanning circuit 510 collects the touch sensing signals output from the touch pads TP arranged in two of the first edge areas A11 and one second edge area A12, and refers the foresaid touch sensing signals as the edge touch sensing signals S1E. In this embodiment, the edge touch data is a part of the touch data S2. The edge touch data indicates the touch operation performed in the edge scanned touch area AEG1.

Then, the processing circuit 820 calculates edge touch control information corresponding to the first edge area A11 according to the edge touch data. The edge touch control information is a part of the touch control information S3. The edge touch control information indicates the report coordinate in the edge scanned touch area AEG1, and especially indicates the report coordinate in the first edge area A11.

Specifically, in the embodiment of FIG. 9A, the processing circuit 820 calculates the center of mass coordinate of the M of the scanned sub-areas according to the edge touch data. The foresaid M of the scanned sub-areas are in the edge scanned touch area AEG1. The foresaid center of mass coordinate indicates a position of the touch pad TP1, and may be illustrated as (1, 1).

Then, the processing circuit 820 multiplies the center of mass coordinate (e.g., (1, 1)) with the size (e.g., (50, 50)) of the touch pad TP1, to generate the intermediate coordinate of M of the scanned sub-areas. The foresaid M of the scanned sub-areas are in the edge scanned touch area AEG1. As such, the foresaid intermediate coordinate may be illustrated as (50, 50).

Then, the processing circuit 820 subtracts the offset coordinate (e.g., (50/2, 50/2)) from the foresaid intermediate coordinate (e.g., (50, 50)) to generate the edge touch data of one corresponding of the scanned touch areas of the edge scanned touch area AEG1. The foresaid scanned sub-area may be the one that is overlapped with the touch pad TP1. As such, the edge touch data corresponding to such scanned sub-area may be illustrated as a position coordinate MC1 (25, 25). The position coordinate MC1 (25, 25) is also set to be as one of the touch control information S3 of the edge scanned touch area AEG1.

Relative to FIG. 9A, in the embodiment of FIG. 9B, the scanning circuit 810 generates the edge scanned touch area AEG1 by collecting one second edge area A12 and one first edge area A11. The operations regarding the edge scanned touch area AEG1 may be described with reference to and by analogy with the operations performed by the touch display IC 800*a* in FIG. 9A.

To sum up, in the of the embodiments of the disclosure, by setting the initial area that is overlapped with multiple rows of the touch pad array, the scanning circuit collects the corresponding touch sensing signals. As such, the touch display IC is capable of increasing the amount of the touch data, so as to improve the sensitivity of the touch operation. In addition, by sequentially shifting the initial area, the scanning circuit collects the touch data corresponding to each of the rows. As such, the touch display IC is capable of increasing the signal-to-noise (SNR) of the touch data, so as to improve the accuracy of the report coordinates.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch display integrated circuit, adapted to drive a touch display panel, comprising:
   a scanning circuit, coupled to a plurality of touch pads of the touch display panel, and configured to set an initial area, generate a plurality of scanned touch areas by sequentially shifting the initial area with a pre-setting distance, and obtain a plurality of touch sensing signals according to the plurality of scanned touch areas to generate touch data, wherein at least a part of the plurality of scanned touch areas are overlapped, wherein a size of the initial area equals to N of the plurality of touch pads and N is a positive number greater than 1; and
   a processing circuit, coupled to the scanning circuit, and configured to calculate touch control information corresponding to each of the plurality of scanned touch areas according to the touch data.

2. The touch display integrated circuit according to claim 1, wherein the pre-setting distance is less than a width or a length of the initial area.

3. The touch display integrated circuit according to claim 2, wherein the pre-setting distance equals to a width or a length of one touch pad.

4. The touch display integrated circuit according to claim 1, wherein each of the plurality of scanned touch areas comprises M of scanned sub-areas, and a size of each of the M of the scanned sub-areas equals to M of the plurality of touch pads, wherein M is a positive number greater than 1 and less than N.

5. The touch display integrated circuit according to claim 4, wherein the processing circuit is configured to:

calculate a center of mass coordinate of each of the M scanned sub-areas according to the touch data;

multiply the center of mass coordinate with the size of each of the plurality of touch pads to generate an intermediate coordinate; and subtract an offset coordinate from the intermediate coordinate to generate the touch control information corresponding to one of the M of the scanned sub-areas to be as one of the touch control information of one corresponding of the plurality of scanned touch areas, wherein the offset coordinate is set according to a half of the pre-setting distance and a half of a width or a length of one touch pad.

6. The touch display integrated circuit according to claim 1, wherein the scanning circuit is configured to:

generate a first scanned touch area by shifting the initial area with the pre-setting distance;

obtain a first plurality of touch sensing signals according to the first scanned touch area to generate first touch data;

generate a second scanned touch area by shifting the first scanned touch area with the pre-setting distance; and obtain a second plurality of touch sensing signals according to the second scanned touch areas to generate second touch data, wherein the first scanned touch area and the second scanned touch area are overlapped with at least one scanned sub-area that has a size of one touch pad, and are not overlapped with a first edge of an active area of the touch display panel.

7. The touch display integrated circuit according to claim 6, wherein the processing circuit is configured to:

calculate first touch control information corresponding to a first scanned sub-area of the first scanned touch area according to the first touch data; and calculate second touch control information corresponding to a second scanned sub-area of the second scanned touch area according to the second touch data, wherein the first scanned sub-area and the second scanned touch area are adjacent, and respectively have a size of one touch pad.

8. The touch display integrated circuit according to claim 1, wherein the scanning circuit is configured to:

set a first edge area, wherein a size of the first edge area equals to P of the plurality of touch pads that are adjacent to a first edge of an active area of the touch display panel, and P is a positive number greater than 1;

set a second edge area that is adjacent to the first edge area, wherein a size of the second edge area equals to the P of the plurality of touch pads;

generate an edge scanned touch area by collecting the second edge area and at least one of the first edge area; and obtain a plurality of edge touch sensing signals according to the edge scanned touch area to generate edge touch data.

9. The touch display integrated circuit according to claim 8, wherein the processing circuit is configured to calculate edge touch control information corresponding to the first edge area according to the edge touch data.

10. The touch display integrated circuit according to claim 1, wherein the scanning circuit is configured to sequentially shift the initial area with the pre-setting distance with respect to a first direction or a second direction.

11. The touch display integrated circuit according to claim 1, wherein the scanning circuit comprises:

a combining circuit, coupled to the plurality of touch pads, and configured to generate the plurality of scanned touch areas, and obtain the plurality of touch sensing signals according to the plurality of scanned touch areas;

an analog circuit, coupled to the combining circuit, and configured to generate a plurality of modulated touch sensing signals according to the plurality of touch sensing signals; and an analog-to-digital converter circuit, coupled to the analog circuit and the processing circuit, and configured to generate the touch data according to the plurality of modulated touch sensing signals.

12. An operating method of a touch display integrated circuit, comprising:

setting, by a scanning circuit of the touch display integrated circuit, an initial area;

sequentially shifting, by the scanning circuit, the initial area with a pre-setting distance to generate a plurality of scanned touch areas;

obtaining, by the scanning circuit, a plurality of touch sensing signals according to the plurality of scanned touch areas to generate touch data, wherein at least a part of the plurality of scanned touch areas are overlapped, wherein a size of the initial area equals to N of the plurality of touch pads and N is a positive number greater than 1; and calculating, by a processing circuit of the touch display integrated circuit, touch control information corresponding to each of the plurality of scanned touch areas according to the touch data.

13. The operating method of the touch display integrated circuit according to claim 12, wherein the pre-setting distance is less than a width or a length of the initial area.

14. The operating method of the touch display integrated circuit according to claim 13, wherein the pre-setting distance equals to a width or a length of one touch pad.

15. The operating method of the touch display integrated circuit according to claim 12, wherein each of the plurality of scanned touch areas comprises M of scanned sub-areas, and a size of each of the M of the scanned sub-areas equals to M of the plurality of touch pads, wherein M is a positive number greater than 1 and less than N.

16. The operating method of the touch display integrated circuit according to claim 15, further comprising:

calculating, by the processing circuit, a center of mass coordinate of each of the M scanned sub-areas according to the touch data;

multiplying, by the processing circuit, the center of mass coordinate with the size of each of the plurality of touch pads to generate an intermediate coordinate; and subtracting, by the processing circuit, an offset coordinate from the intermediate coordinate to generate the touch control information corresponding to one of the M of the scanned sub-areas to be as one of the touch control information of one corresponding of the plurality of scanned touch areas, wherein the offset coordinate is set according to a half of the pre-setting distance and a half of a width or a length of one touch pad.

17. The operating method of the touch display integrated circuit according to claim 12, wherein the step of sequentially shifting the initial area with the pre-setting distance to generate the plurality of scanned touch areas comprises:

generating, by the scanning circuit, a first scanned touch area by shifting the initial area with the pre-setting distance; and generating, by the scanning circuit, a second scanned touch area by shifting the first scanned touch area with the pre-setting distance, wherein the step of obtaining the plurality of touch sensing signals according to the plurality of scanned touch areas to generate the touch data comprises:

obtaining, by the scanning circuit, a first plurality of touch sensing signals according to the first scanned touch area to generate first touch data; and obtaining, by the scanning circuit, a second plurality of touch sensing signals according to the second scanned touch areas to generate second touch data, wherein the first scanned touch area and the second scanned touch area are overlapped with at least one scanned sub-area that has a size of one touch pad, and are not overlapped with a first edge of an active area of the touch display panel.

18. The operating method of the touch display integrated circuit according to claim 17, wherein the step of calculating the touch control information corresponding to each of the plurality of scanned touch areas according to the touch data comprises:

calculating, by the processing circuit, first touch control information corresponding to a first scanned sub-area of the first scanned touch area according to the first touch data; and calculating, by the processing circuit, second touch control information corresponding to a second scanned sub-area of the second scanned touch area according to the second touch data, wherein the first scanned sub-area and the second scanned touch area are adjacent, and respectively have a size of one touch pad.

19. The operating method of the touch display integrated circuit according to claim 12, further comprising:

setting, by the scanning circuit, a first edge area, wherein a size of the first edge area equals to P of the plurality of touch pads that are adjacent to a first edge of an active area of the touch display panel, and P is a positive number greater than 1;

setting, by the scanning circuit, a second edge area that is adjacent to the first edge area, wherein a size of the second edge area equals to the P of the plurality of touch pads;

collecting, by the scanning circuit, the second edge area and at least one of the first edge area to generate an edge scanned touch area; and obtaining, by the scanning circuit, a plurality of edge touch sensing signals according to the edge scanned touch area to generate edge touch data.

20. The operating method of the touch display integrated circuit according to claim 19, further comprising:

calculating, by the processing circuit, edge touch control information corresponding to the first edge area according to the edge touch data.

21. The operating method of the touch display integrated circuit according to claim 12, wherein the step of sequentially shifting the initial area with the pre-setting distance to generate the plurality of scanned touch areas comprises:

sequentially shifting, by the scanning circuit, the initial area with the pre-setting distance with respect to a first direction or a second direction.

22. A touch display device, comprising:

a touch display panel, comprising a plurality of touch pads; and a touch display integrated circuit, coupled to the touch display panel, and configured to drive the touch display panel, comprising:

a scanning circuit, coupled to the plurality of touch pads, and configured to set an initial area, generate a plurality of scanned touch areas by sequentially shifting the initial area with a pre-setting distance, and obtain a plurality of touch sensing signals according to the plurality of scanned touch areas to generate touch data, wherein at least a part of the plurality of scanned touch areas are overlapped, wherein a size of the initial area equals to N of the plurality of touch pads and N is a positive number greater than 1; and a processing circuit, coupled to the scanning circuit, and configured to calculate touch control information corresponding to each of the plurality of scanned touch areas according to the touch data.

* * * * *